Figure 1:
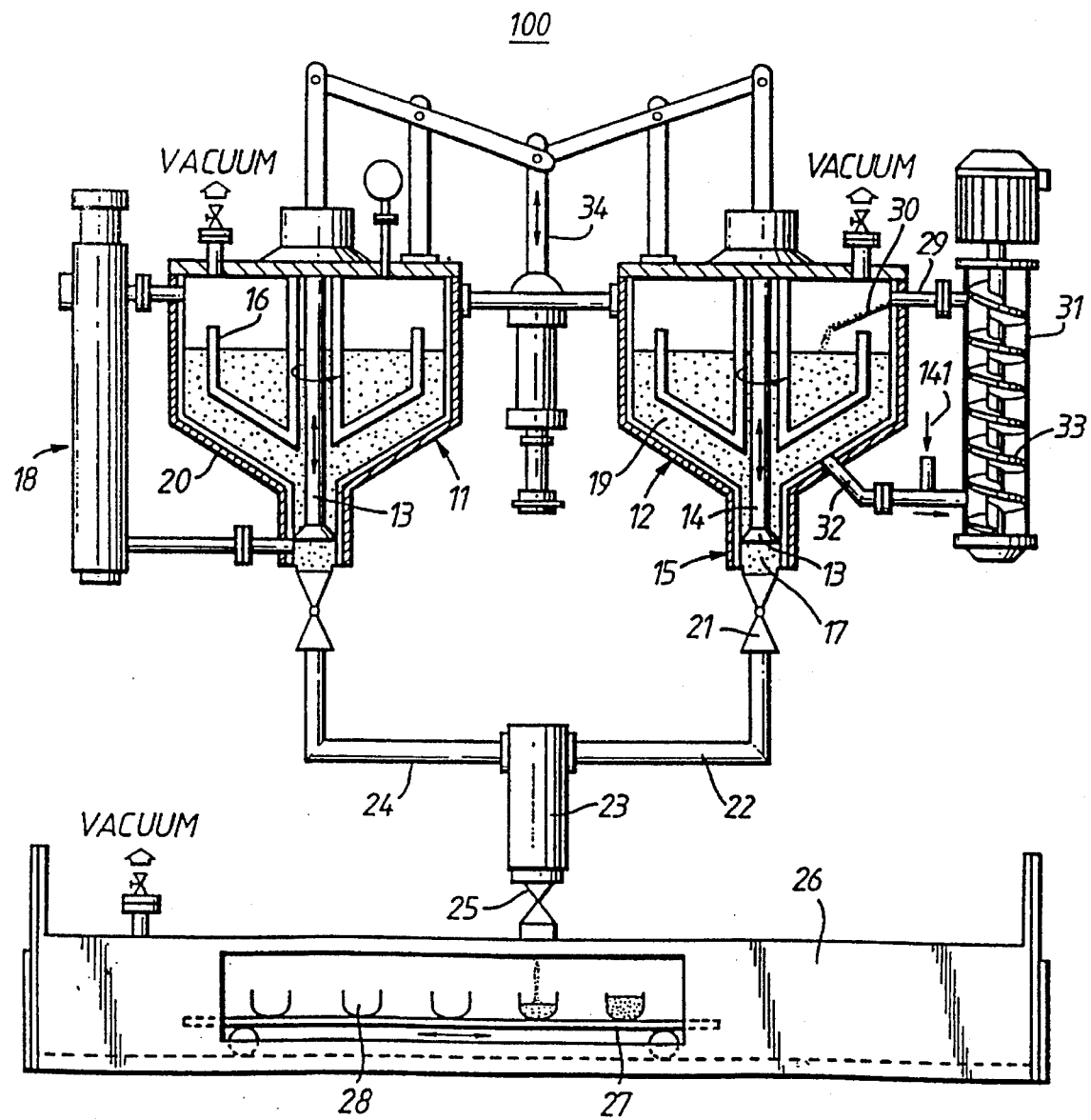

United States Patent [19]
Terhardt

[11] Patent Number: 5,529,212
[45] Date of Patent: Jun. 25, 1996

[54] METHOD OF AND APPARATUS FOR TRANSPORTING AND CONDITIONING CASTING MATERIALS AND FOR CHARGING CASTING MACHINES WITH THEM

[75] Inventor: Josef Terhardt, Rhede, Germany

[73] Assignee: Verfahrenstechnik Hubers GmbH, Bocholt, Germany

[21] Appl. No.: 162,072

[22] PCT Filed: May 29, 1992

[86] PCT No.: PCT/EP92/01202

§ 371 Date: May 23, 1994

§ 102(e) Date: May 23, 1994

[87] PCT Pub. No.: WO92/22377

PCT Pub. Date: Dec. 23, 1992

[30] Foreign Application Priority Data

Jun. 13, 1991 [DE] Germany .......................... 41 19 415.2

[51] Int. Cl.⁶ .................................................. B67B 7/00
[52] U.S. Cl. ........................ 222/1; 222/135; 222/145.6; 222/185.1
[58] Field of Search .................................. 222/135, 137, 222/145.1, 145.6, 54, 152, 642, 234, 235, 185.1, 318, 424, 505, 1; 239/58, 135, 139

[56] References Cited

U.S. PATENT DOCUMENTS

| | | | |
|---|---|---|---|
| 2,044,326 | 6/1936 | Pickell | 222/185 |
| 2,244,681 | 6/1941 | Florcyk | 222/137 |
| 2,341,950 | 2/1944 | Schepps | 222/185 |
| 2,840,276 | 6/1958 | Dreyer, Jr. et al. | 222/185 |
| 3,278,081 | 10/1966 | Carter | 222/185 |
| 3,386,623 | 6/1968 | Berrill et al. | 222/135 |
| 3,773,300 | 11/1973 | Hauser | 222/135 |
| 3,889,848 | 6/1975 | Ricciardi et al. | 222/58 |
| 3,901,409 | 8/1975 | Bradley et al. | 222/145.6 |
| 3,993,224 | 11/1976 | Harrison | 222/135 |
| 4,116,367 | 9/1978 | Kataoka et al. | 222/424 |
| 4,167,236 | 9/1979 | Taubenmann | 222/135 |
| 4,293,082 | 10/1981 | Matsueda | 222/185 |
| 4,617,982 | 10/1986 | Tanimura et al. | 222/135 |
| 4,667,084 | 5/1987 | Regge | 239/135 |
| 4,774,059 | 9/1988 | Wagner | 222/137 |
| 5,397,180 | 3/1995 | Miller | 222/145.1 |

Primary Examiner—Andres Kashnikow
Assistant Examiner—Lisa Douglas
Attorney, Agent, or Firm—William C. Gerstenzang; Spring Horn Kramer & Woods

[57] ABSTRACT

Method and apparatus for storing, transporting and conditioning casting materials, wherein said materials are stored and transported in holding tanks capable of being connected to casting machines and being equipped with extruders having plungers for discharging discrete amounts of the stored material to the casting machines.

10 Claims, 7 Drawing Sheets

METHOD OF AND APPARATUS FOR TRANSPORTING AND CONDITIONING CASTING MATERIALS AND FOR CHARGING CASTING MACHINES WITH THEM

FIELD

The present invention concerns a method of and apparatus for transporting and conditioning casting materials and for charging casting machines with them. The materials can be resins, blends (of such resins and of curer for example), or components of such blends. The invention is specifically intended for materials that fillers have been added to when the fillers tend to settle to the bottom. Several tanks hold the casting material or components. The holding tanks have open tops with lids or intakes with caps and the air can preferably be evacuated from them. Associated with each holding tank is an extruder that accommodates a plunger and releases discrete portions of the material. The plunger is actuated by drive mechanisms and opens and closes the tank's outlet.

STATE OF THE ART

A method that is essentially similar except that it does not involve transporting the materials is known from German 3 803 418 A1, which derives from the present applicant.

The publication also discloses apparatus or mechanisms for carrying out the method (with the exclusion of transportation). The apparatus comprises a plasticizing section with casting machines and at least one tank for holding casting materials or components. The tanks have open tops with lids or intakes with caps and the air can be evacuated from them. Extruders release discrete portions of the material or component to such downstream devices as blenders and casting machines.

Although the known method and apparatus are mostly satisfactory, they have significant drawbacks from the increasingly significant aspect of environmental protection.

These drawbacks derive in particular from the aromatic solvents that are often part of the blends employed to embed electronic components for example. Such solvents constitute hazards not only for the plant personnel but for the environment in general.

Another drawback is that the materials come in containers that cause problems not only in their manufacture but also in their disposal. The empty containers always contain residue that can be dangerous whether the containers are burned or landfilled.

The containers are also expensive to manufacture and dispose of. The conventional methods and apparatus employed to handle such materials require labor-intensive and costly safety measures to prevent as many pollutants as possible from escaping from the system and injuring people or damaging the environment.

Destructive fumes occur in particular when blends containing fillers susceptible to setting are kneaded.

The object of the present invention is accordingly an improved method and an improved apparatus of the aforesaid genus that will have the aforesaid drawbacks to a limited extent if at all.

This object is attained in a method of the aforesaid genus by characteristics that will now be described. The materials are loaded into the tanks with the outlets closed and the tops or intakes open, the tops or intakes are closed, and the air is optionally evacuated from the loaded tanks. The sealed tanks are kept on hand for a possibly long period or transported over a possibly long distance or both. The tanks are connected to the casting machines, the drive mechanisms are started, the materials are conditioned, and the casting machines charged with them.

No containers need to be manufactured to store the materials or transport them from one site to the other, and then to be disposed of. The time and labor involved in manufacturing and disposing of them are saved. Their contents do not have to be transferred to hoppers, entailing the risk of hazardous fumes escaping and the inconvenience of having to vacuum-extract them as must now be done when blends that have bottom-settling components are kneaded.

This embodiment of the method in accordance with the invention can have several convenient features. When for example the holding tank, like some state-of-the-art tanks, accommodates kneading blades, the blades can be coupled to drive mechanisms at the second site. Again, when, as at the state of the art, the holding tank has a connection for a vacuum pump, the tank can be connected to the vacuum pump at the second site. Finally, and again as at the state of the art, when the holding tank has a heater, the heater can be connected with a source of heat at the second site.

One or more preferably smaller holding tanks can be connected to such a holding tank downstream at the second site to assume handling of the material, with one or more associated extruders that release discrete portions of casting material. Other components can also be added at this point and the material plasticized or otherwise conditioned.

The material can be recirculated from one holding tank to another through supply or refluxing lines for example. Circulation prevents any solids in the resin or blend standing in the lines while no material is being forwarded from depositing on the inner surface.

Pressure or vacuum, temperature, and other parameters can be regulated by controls.

The material can be prevented from depositing on the inner surface of the holding tank by keeping the kneading blades in constant motion or, if the material does not deposit too rapidly, in intermittent motion.

When a prescribed conditioning time must be observed, as in the embedding of certain electronic components for instance, the material can be released from the tank only after that time or once a specific viscosity, temperature, pressure, gas content, or other parameter has been attained.

The method of transporting, conditioning, and introducing resins, blends, and components thereof in accordance with the invention accordingly employs reusable containers. The containers are easy to handle, and limit or prevent the escape of pollutants. They comply with the increasingly common governmental regulations against single-use containers. The method facilitates in particular the transportation of materials containing fillers that settle to the bottom and of abrasive materials. It eliminates the material and labor costs of loading single-use containers and evacuating the air. The sealed tanks prevent air from coming into contact with the material and spoiling it. The final user will not have to dispose of any containers.

The multiple-use containers in accordance with the invention eliminate the need for such previously necessary accessories as heaters, vibrators, and hoppers as well as trash facilities.

Protective clothing and other such measures are also at least to some extent eliminated.

The apparatus for carrying out the method in accordance with the invention comprises at least one tank for holding such materials as resins, blends (of such resins and of curers for example), or components of such blends positioned along with casting machines, blenders or casting-machine chargers for example, at a particular operating point. The tanks have open tops with lids or intakes with caps and the air can preferably be evacuated from them. Associated with each holding tank are extruders that release discrete portions of the material to the casting machines.

The apparatus can also include a jig and stand that accommodate the holding tank. They can have take-apart clutches that couple drive mechanisms to material-conditioning mechanisms in or on the tank.

The jig and stand can have take-apart clutches that couple drive mechanisms to kneading blades inside the tank.

The stand can accommodate a rapid-action connection for establishing communication between a vacuum line outside the holding tank and equipment inside the tank for evacuating gas therefrom.

The stand can accommodate rapid-action connectors for establishing communication between a reservoir of fluid outside the holding tank and coils inside the tank for heating or cooling the material therein. The fluid can be oil or water. The material can also be heated by electric heaters inside the tank.

The stand can accommodate rapid-action connectors for establishing communications between regulators and controls for mechanical, electric, vacuum, and heating and cooling mechanisms and sensors in or on the holding tank that detect temperature, pressure, viscosity, mechanical-component location, etc.

The invention will be of particular advantage when the overall system includes several independent operating points.

The apparatus can also include a stand to accommodate a holding tank at a tank-filling and casting-material conditioning point.

The stand can have a mechanism for removing the lid of the holding tank. The stand itself can be provided with mechanisms to drive the kneading blades or casting-material forwarding pump.

It is preferable for the holding tank to be a boiler-like pressurizable container with a round cross-section accommodated in a transportation-and-stacking jig. The cross-section of the jig will preferably be square.

The holding tank can alternatively be stacked on spacers.

The jigs can be transported by forklift. This is of particular advantage when the holding tanks are too large to be carried around by muscle power alone.

A holding tank constituting a reusable container of such a metal as steel, preferably lined with stainless steel or plastic will be particularly practical.

It will also be practical for the holding tank to accommodate kneading blades that fit into its bottom.

It will be particularly easy to heat and cool its contents if the wall of the holding tank is hollow and accommodates a hot or cold fluid. The contents can also be kept warm by an electric blanket wrapped around the tank.

It will also be an advantage for the holding tank be heat-and-cold insulated. The insulation can be protected with a layer of sheet metal for example.

The casting-material outlet at the bottom of the holding tank will preferably have a connection for attaching the tank to processing equipment. The casting-material outlet can also have a liquid-and-gas tight cap to protect it while the holding tank is being transported and to prevent leakage. The protective cap will be particularly useful when the outlet has outside threads for attaching it to connecting lines. Extra leakage prevention is particularly necessary when the outlet is in the form of a cock, which prevents leakage subject to normal operating conditions.

BRIEF DESCRIPTION OF THE INVENTION

Figure 2:
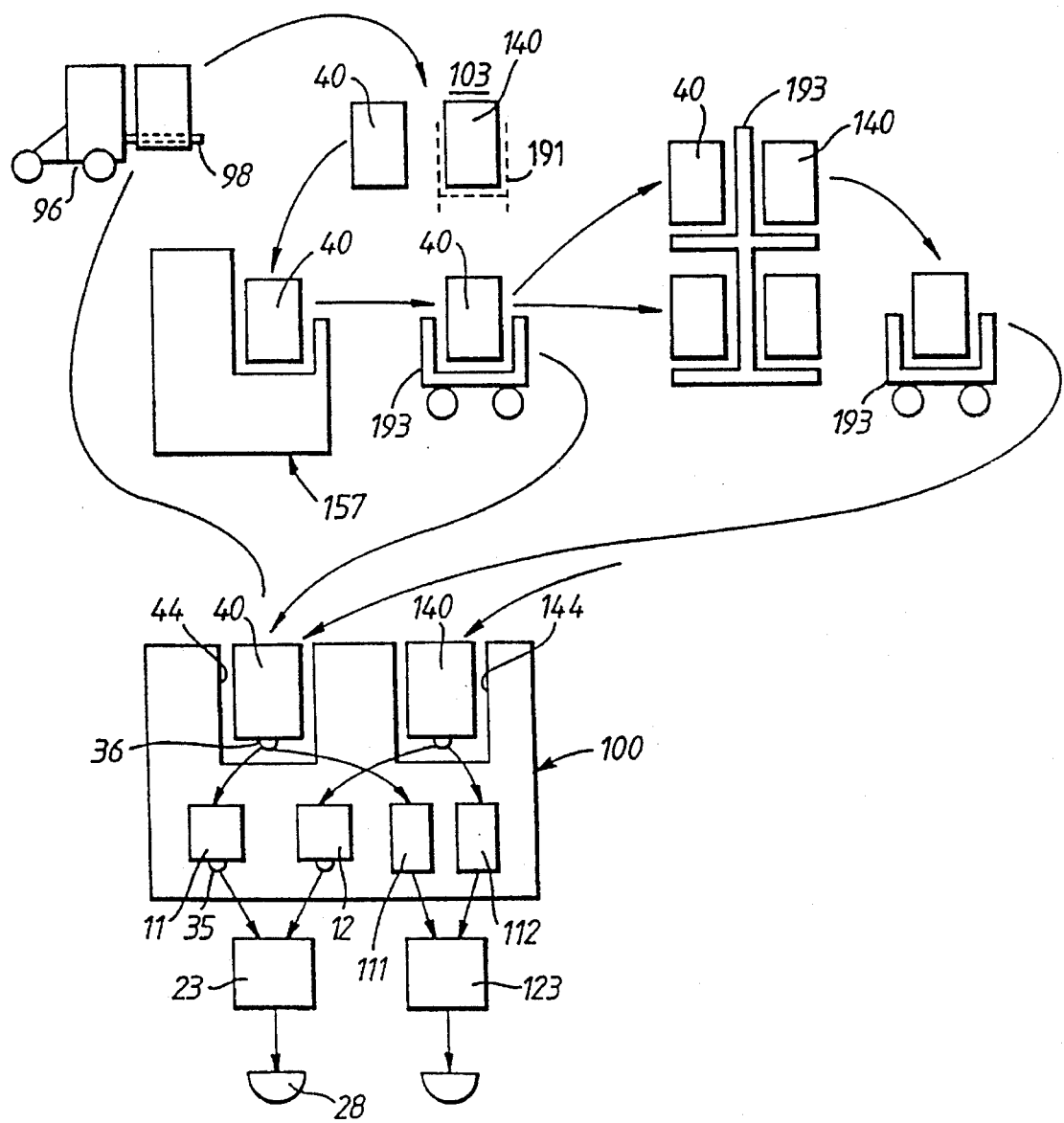
Figure 3:
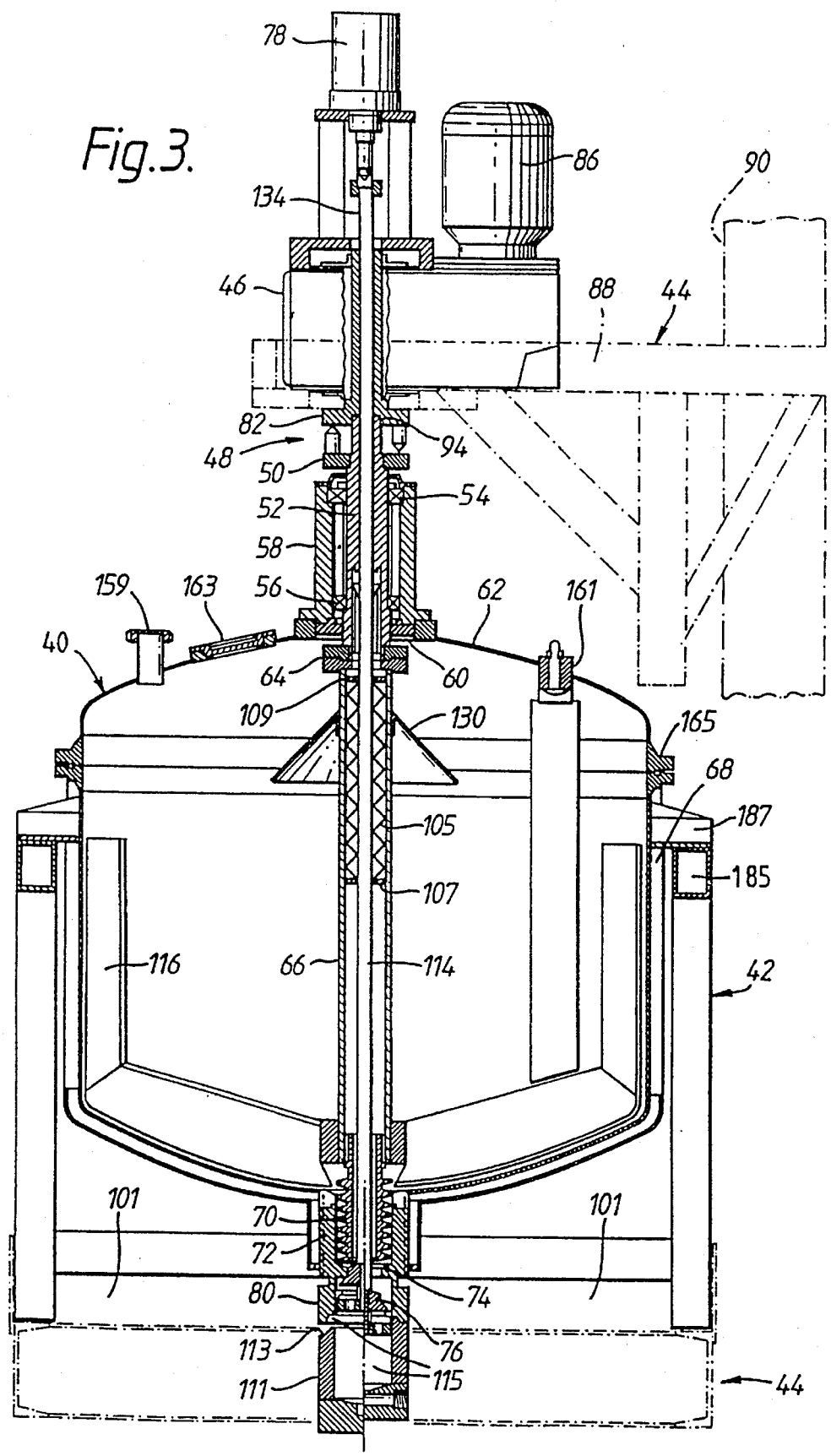
Figure 4:
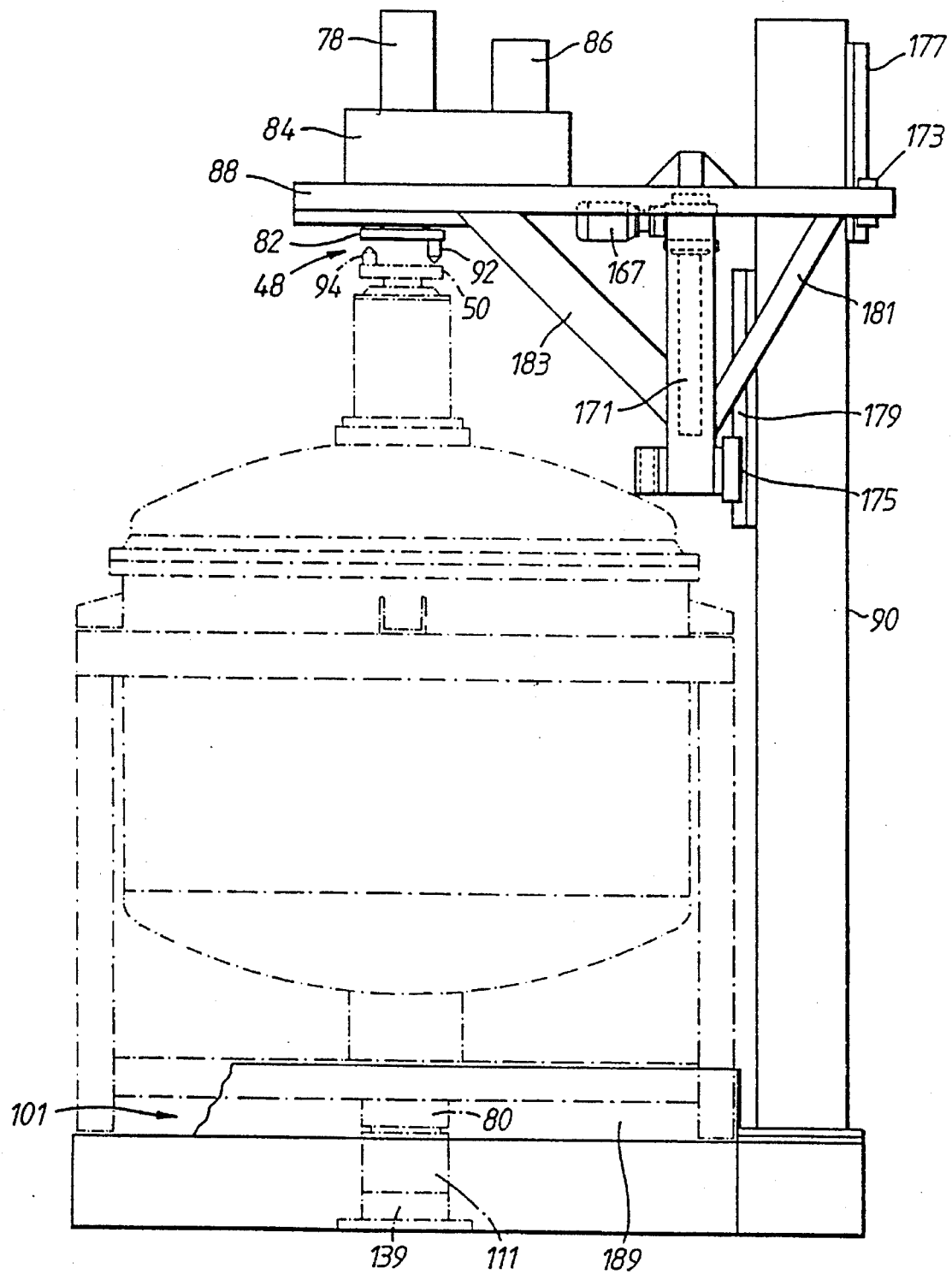
Figure 5:
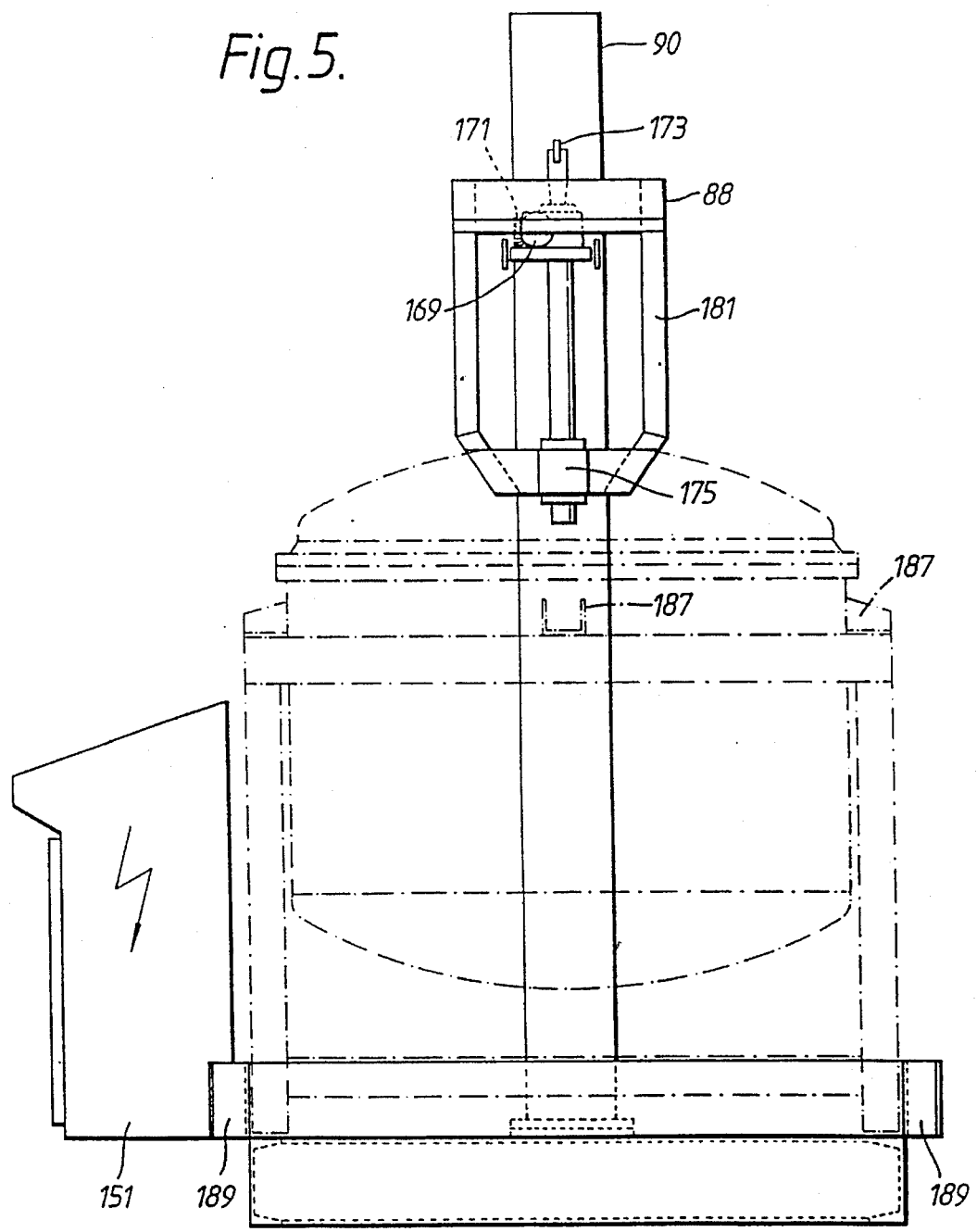
Figure 6:
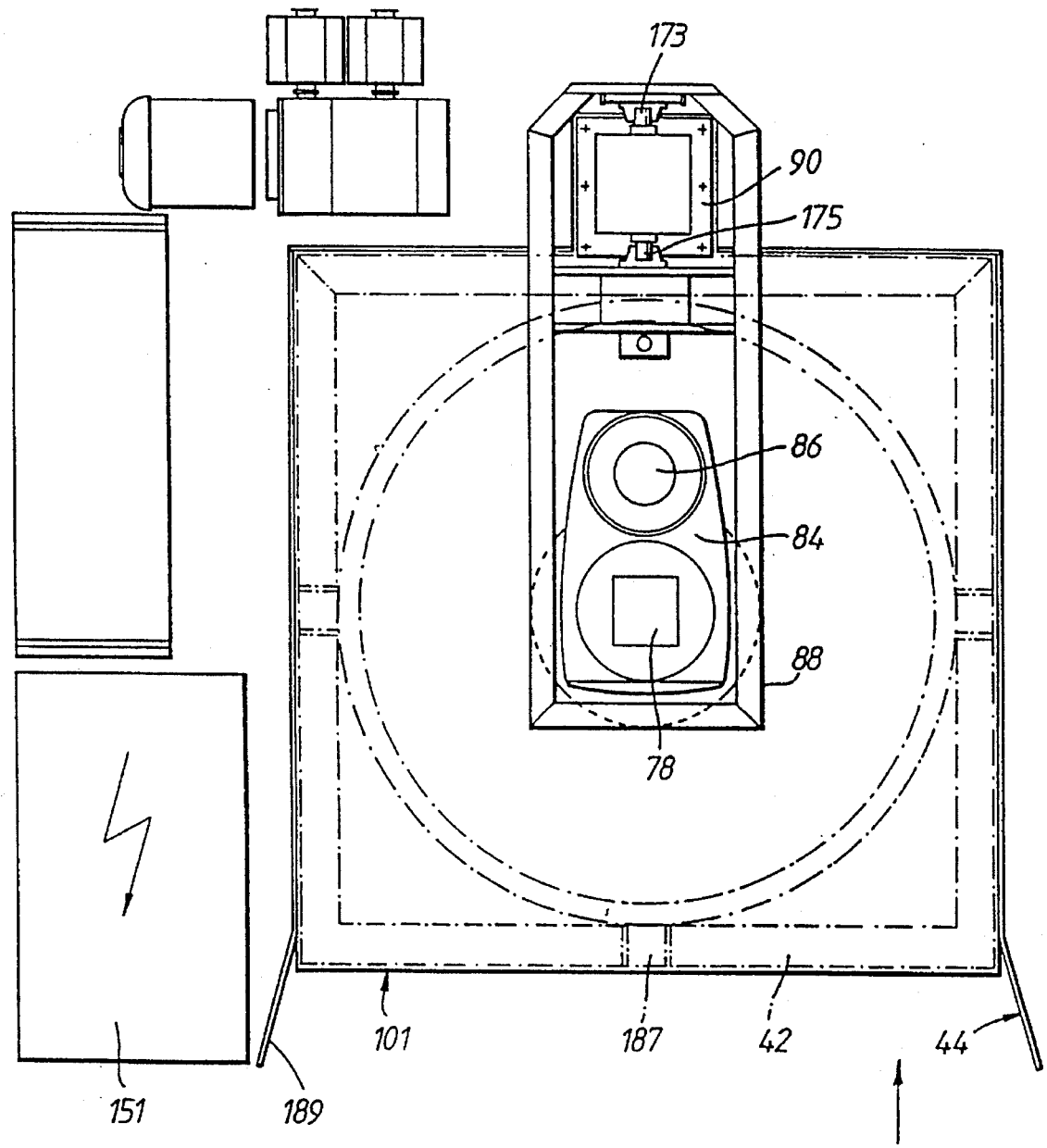
Figure 7:
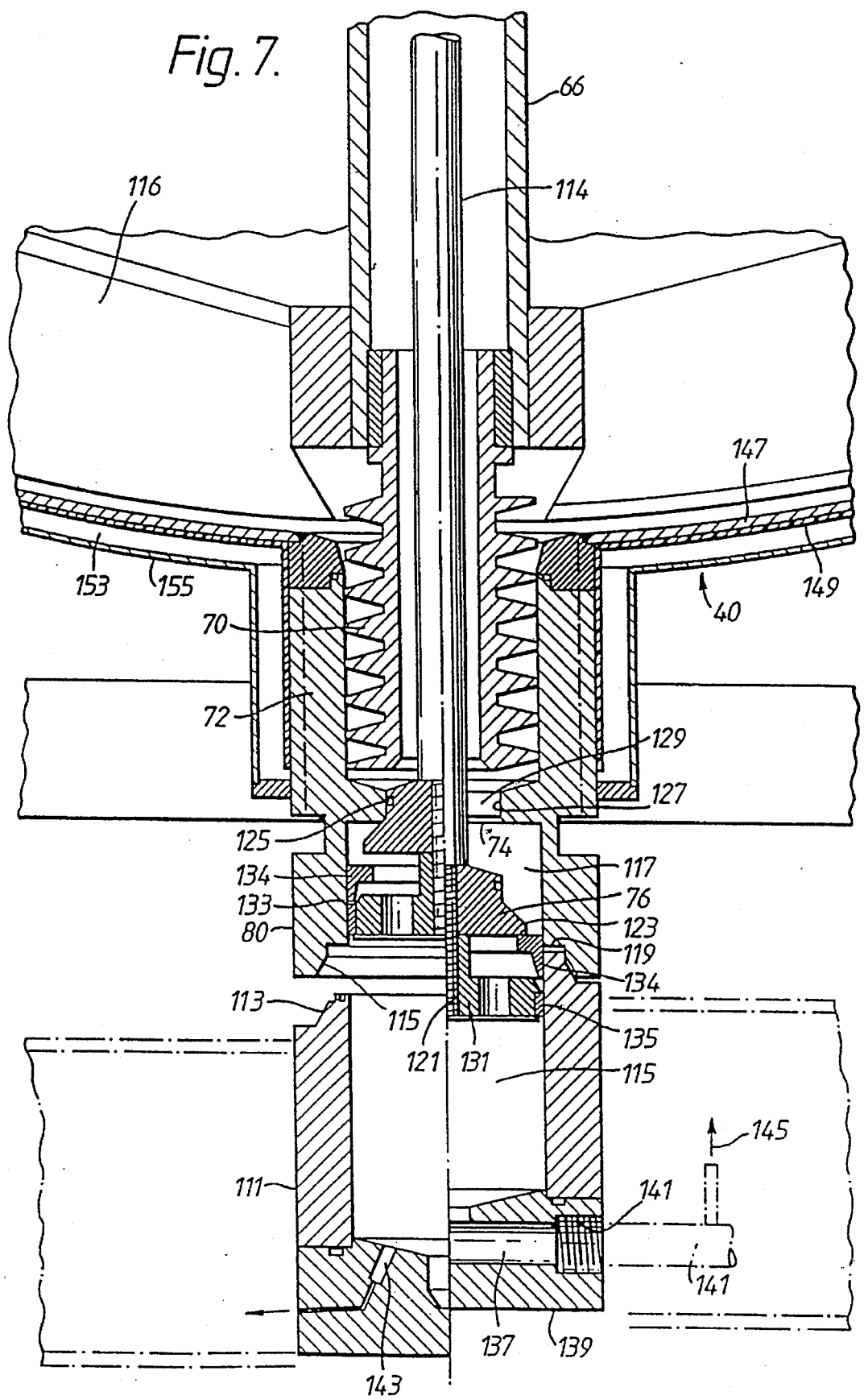

Embodiments of the invention will now be specified with reference to the drawing, wherein FIG. 1 illustrates casting-material conditioning and casting-machine charging apparatus at state of the art, FIG. 2 is a schematic drawing illustrating the overall system in accordance with the invention, FIG. 3 is an axial section through one practical embodiment of a holding tank in accordance with the invention in the process of releasing casting material, FIG. 4 is a simplified side view of the tank illustrated in FIG. 3, FIG. 5 is a similar view of the tank rotated 90°, FIG. 6 is a top view of the tank, and FIG. 7 is a large-scale axial section through the tank's outlet.

PREFERRED EMBODIMENTS OF THE INVENTION

The casting-material conditioning and casting-machine charging point 100 illustrated in FIG. 1 includes two holding tanks 11 and 12, one for each component of a blend that will be employed for the production of castings. One such component might be a polyester resin filled with particles of such a material as quartz and the other a curer for example. The tanks are large enough to accommodate at least one day's supply of casting material. Vapor and air are evacuated from the tanks by an unillustrated pump. Gas and moisture are removed from the material and the material is homogenized by kneading with blades 16. It can also be heated by fluid circulated by a pump 18 or by an unillustrated electric blanket. Uniform temperature is maintained throughout the material by insulation 20.

Each holding tank 11 or 12 also has an extruder 15. A plunger 14 travels up and down inside extruder 15. Plunger 14 extends through the hollow shaft of kneading blades 16. When the plunger is all the way down, it's head 13 closes off a casting-material outlet 17 at the bottom of the tank. When the plunger retracts up into the kneading-blade shaft on the other hand, outlet 17 opens and allows casting-material component 19 into the cylindrical section just above it. When the plunger descends again it forces a discrete portion of component 19 out of the tank through outlet 17. The component now travels through a cock 21 and a line 22 or 24 to a stationary blender 23. Another component can arrive in stationary blender 23 from the other tank through another line 24 or 22. Blender 23 blends the components and releases the blend to a possibly vacuumized casting chamber 26 through a blend-emitting cock 25. Cock 25, finally, loads the material into molds 28 traveling through chamber 26 on pallets 27.

Holding tanks 11 and 12 can be loaded with material from throwaway containers through their open tops by removing the tanks' lids. Material can also be loaded through an intake 29 from a screw 33 accommodated in a cylinder 31. One tank can be loaded with resin and the other with curer.

The components can be degassed by way of a sheet-metal baffle 30, over which the viscous components will flow in a shallow layer, allowing any bubbles to rise to the surface and burst.

The degassing apparatus can also include a screw 33 that is accommodated in a cylinder 31 and recirculates components from the bottom 32 of holding tank 12 to an intake 29 that drops them onto baffle 30.

The overall method is represented schematically in FIG. 2. The overall conditioning-and-charging point 100 includes, in addition to holding tanks 11 and 12 that communicate with a downstream stationary blender 23 and hence through the aforesaid portioning mechanisms with a cast 28, such similar components as additional holding tanks 111 and 112 and another blender 123.

The supply of resin, blend, or component in one or both holding tanks 11 and 12 will be exhausted after a prescribed number of strokes on the part of the central piston-driven driveshaft 34 for example. The number of strokes can be counted and the total can trigger an "empty" or tank-replacement signal. Such a signal can also be generated by sensors that detect the level or weight of the materials inside the tanks.

The system can be exploited at maximal efficiency by loading the tanks with enough material and possibly just enough material for a particular run. If the run is to last two eight-hour shifts for example, the tanks can be loaded with enough material to last 16 hours. At the beginning of the third shift, accordingly, fresh material will have to be added, possibly after cleaning out the tank, from more throwaway containers. The material will then be conventionally conditioned by heating it to a prescribed temperature for example with fluid-circulating pump 18 for example. The material will simultaneously be thoroughly kneaded, producing an intimate blend of resin and filler for example. Any gas that develops and, since the procedure occurs in a vacuum, any liquid as well can be eliminated with a baffle.

Operations must of course be discontinued to add new material to the tanks. It is also impossible to prevent the escape of fumes that could be detrimental to personnel and to the environment. The personnel can also sustain injuries by coming into contact with the materials. Finally contamination can easily enter the tanks through the even partly open top.

The containers that the fresh materials arrive in must be disposed of when empty in accordance with hazard-waste regulations. Given that one ton of curer can be employed in a day, the volume of such trash can be considerable.

All these drawbacks can, however, be eliminated by using the method in accordance with the present invention, one embodiment of which will now be specified with reference to FIG. 2. The holding tanks 40 and 140 employed in this method are employed like the tanks 11 and 12 specified with reference to FIG. 1 for conditioning the material and charging the casting machines while also acting in the capacity of reusable transportation containers for the material. The tanks are accommodated at conditioning-and-charging point 100 in accordance with the invention in stands 44 and 144. As will be evident from FIGS. 3 and 4, the stands are provided with mechanisms 46 that can be coupled to and can drive the material-conditioning mechanisms accommodated inside the tanks by way of a take-apart clutch 48. Clutch 48 comprises a disk 50 mounted stationary on a shaft 52 that rotates by way of ball bearings 54 and 56 in an extension 58.

Shaft 52 extends into holding tank 40 through an opening 60 in the lid 62 of the tank. It is secured at that point to a cylinder 66 by a flange 64. At the top of cylinder 66 is a sheet-metal baffle 130 and at the bottom are kneading blades 116. The blades fit not quite tight against the inner surface of the wall 68 at the bottom of holding tank 40. Practically no solid material can accordingly settle at this level as long as the blades are rotating. Any filler that has settled during transportation and storage will be lifted up and the homogeneity of the blend will be ensured. This feature is of particular significance to the casting of spark plugs for example.

At the bottom of cylinder 66 is an extruder. The housing 72 of the extruder accommodates both a screw 70 and a plunger 114. Plunger 114 extends up through cylinder 66 and through a hollow shaft 52 to the bottom of a driveshaft 134. At this level plunger 114 attaches to driveshaft 134 by way of a take-apart clutch 48. Driveshaft 134 is itself raised and lowered by a piston-and-cylinder mechanism 78, raising and lowering plunger 114. When the head 76 at the bottom of plunger 114 is up, as illustrated in the left half of FIGS. 3 and 7, it rests against a seat 74 on housing 72 and prevents the casting material from leaving holding tank 40 through outlet 80. When the plunger is down on the other hand, as illustrated in the right half of the figures, the material can drop out of the tank through outlet 80. The material's escape can be promoted by screw 70 when necessary.

The other disk 82 in clutch 48 is powered by for example a motor 86 by way of a transmission 84.

Transmission 84 is mounted on a beam 88 that extends horizontally out of a post 90. Beam 88 travels up and down on post 90. As the beam travels down it brings together the two disks 50 and 82 that comprise take-apart clutch 48. When the two disks are in contact, pins 92 and 94 on each extend into matching bores on the other, engaging clutch 48. When beam 88 travels up, it extracts the pins from the bores and separates the disks, disengaging the clutch. As the beam continues to rise, driveshaft 134 separates from plunger 114 at level 94 and rises out of hollow shaft 52. At this stage the drive mechanisms are completely separated from holding tank 40.

The tank can now be extracted along with its transportation-and-stacking jig 42 from its stand 44, by the forklift 96 illustrated in FIG. 2 inserting its arms 98 into gap 101 for example, and transported to another site, to refilling site 103 for example. Since plunger 114 is up and head 76 rests against seat 74 while the tank is being transported, no material can leak out through outlet 80. Plunger 114 is kept up by a spring 105 secured between a perforated disk 107 fastened to the inner surface of cylinder 66 and a similar disk 109 mounted on the plunger. Plunger 114 cannot be forced down again holding tank 40 is in its operating position again with clutch 48 engaged and driveshaft 134 in its accommodations at level 94 and subject to piston-and-cylinder mechanism 78. The tank will accordingly not leak while being transported. Additional security can be provided by an unillustrated cap that screws over outlet 80 or by an unillustrated plug that screws into it.

Also accommodated in the stand 44 at the site where the material is to be released from holding tank 40 is a cylindrical casting-machine intake 111. Intake 111 travels up and down between the lower position illustrated in the left half of FIGS. 3 and 7 and the upper position illustrated on the right. Once holding tank 40 has been positioned along with its transportation-and-stacking jig 42 in stand 44, intake 111 is raised until its upper edge 113 comes to rest tight against a matching shoulder 115 just inside the lower edge of holding-tank outlet 80. This action creates a tightly sealed cylinder, one section of which is constituted by holding-tank outlet 80 and the other by casting-machine intake 111. When plunger head 76 descends, it will, as will be particularly evident from the detail in FIG. 7, be able to function like the head of a piston traveling back and forth within the space constituted by the interior 115 of casting-machine intake 111 and the coincident interior 117 of holding-tank outlet 80. The seal can be enhanced with gaskets or O rings 119. The lower end 121 of plunger 114 is narrow and threaded. The facing 123 of plunger head 76 screws onto lower end 121, leaving a groove 125 around it to accommodate an O ring. The O ring rests against the cylindrical inner surface 127 of the outlet 129 from housing 72, affording extra tightness when plunger head 76 is up. An annular flange 131 also screws onto the lower end 121 of plunger 114. A bushing 134 slides back and forth on lower end 121 between flange 131 and head facing 123 from an upper position illustrated in the left half of FIG. 7 to a lower position illustrated in the right half. Bushing 134 has a lip 133 around the bottom. When the bushing is up, lip 133 rests against an O ring 135 accommodated in a groove around flange 131. When bushing 134 is down, it rests against facing 123.

Plunger-head facing 123, bushing 134, and flange 131 constitute in conjunction with interiors 115 and 117 and with the screw 70 in housing 72 a discrete-portion extruder like that disclosed in German Patent 1 778 396, which is hereby specifically referred to.

Such an extruder can release discrete portions of even a little viscous material through an out-take line constituted by a bore 137 in a terminal plate 139, a fitting that screws into an inside-threaded section 141 at the end of the bore, and a line 24 that leads to a blender 23 of the type illustrated in FIG. 1.

Instead of line 24, however, a line 141 can extend as illustrated in FIG. 7 to an intake into a tank like the holding tank 12 illustrated in FIG. 1. In this event the discrete portioning will either be of no significance or will serve to convey discrete supplies to holding tank 12, which will in turn release smaller discrete portions through an extruder of its own.

When holding tank 40 is empty, no more material will arrive at screw 70, and the pressure in interiors 115 and 117 will fall. This situation can be detected with a pressure transducer 143, preferably situated in terminal plate 139. Pressure transducer 143 will emit one signal as long as there is material in interiors 115 and 117 being compressed by screw 70 or by the material in holding tank 40 and another signal, which can be an alarm for instance, when the interior is empty and no more material is arriving at screw 70. The operating personnel will accordingly be aware that it is time to replace the tank. Plunger 114 is raised (which can occur automatically during the disengagement of clutch 48), lifting valve-head facing 123 until the O ring in groove 125 comes to rest against inner surface 127 and creates a seal. The assembly comprising casting-machine intake 111 and terminal plate 139 is now lowered from the position illustrated in the right half of FIG. 7 to the position illustrated in the left half, where plunger head 76 has already arrived. Holding tank 40 can now be removed to one side unimpeded without being lifted.

Holding tank 40 can, however, be lifted as long as casting-machine intake 111 is up.

The amount of material left in interiors 115 and 117 is much less than the capacity of holding tank 40. The residue can be left in place when a fresh tank is introduced, although care must be taken to ensure the evacuation of any air that enters. Any material that still contains air can be continuously removed ahead of time through an air-removal branch 145 until the sensors indicate that any air, humidity, etc. that has entered has been evacuated along with the forced-in material and interiors 115 and 117 are completely packed again.

To heat the material in holding tank 40 to a particular temperature and maintain it there, the wall 147 of the tank, which is preferably welded steel, can be provided with an electric blanket 149 supplied with power from a source 151 for example. It is alternatively or additionally possible to pump such a heating fluid as water through the space 153 between wall 147 and an outer wall 155 with a pump like the pump 18 illustrated in FIG. 1.

The system so far specified herein with reference to FIG. 2 is devoted to conditioning the casting material and charging the casting machines. How the material is added to the tanks will now be specified, again with reference to FIG. 2. The empty tank is transported from a storage point 103 to a stand in a tank-filling point 157 similar in structure to the stand at conditioning-and-charging point 100 but without the casting-machine intake 111, terminal plate 139, and other material-removal components at the bottom.

The mechanisms employed to condition the material, however, can again be present. The material is added to holding tank 40 through the connection 159 illustrated in FIG. 3, to which a vacuum pump can alternatively be attached in order to evacuate gas from the tank, through a connection 161 communicating with a pipe that extends down to the bottom of kneading blades 116 and forwards material directly to that vicinity, through a windowed manhole 163, or through the open top of the tank once the bolts have been released from flanges 165 and lid 62 has been lifted from pan 68.

Holding tank 40 is now closed again and the material conditioned by degassing, heating, and kneading for example. Kneading blades 116 are rotated by mechanisms 46 and material is simultaneously circulated from the bottom of the tank to the baffle 130 top by unillustrated mechanisms. The mechanisms involved in this procedure are specified in German GM 761 332, claim 6 in particular.

The communications necessary to vacuumize the tank and the connections employed to heat its contents can also be rapidly established and disestablished. Such connections can also be provided between the regulators and controls for mechanical, electric, vacuum, and heating and cooling mechanisms with sensors in or on the holding tank for temperature, pressure, viscosity, mechanical-component location, etc. There can be a control panel like the control panel 151 with displays and control knobs illustrated in FIG. 5, which is a view from the right of the structures illustrated in FIG. 4. The platform and beam 88 can be raised and lowered by way of this panel and by means of a motor 167 through a mechanism comprising a rack 171 or worm gear 171 secured to post 90 and a pinion 69. Beam 88 is guided by rollers 173 and 174 or slides that travel back and forth in tracks 177 and 179 mounted on post 90.

Beam 88 can be reinforced, by braces 181 and 183 for example.

Holding tank 40 is accommodated as will be evident from the figures in a transportation-and-stacking jig 42, which is in the present instance welded out of lengths 185 of box section. The jig's footprint is square, as will be evident from FIG. 6. The cylinder holding tank 40 is attached to the jig by four brackets 187. Transportation-and-stacking jig 42 slides into stand 44 from the side, from the direction indicated by the arrow 101 in FIG. 6 for example. Insertion is facilitated by sheet-metal guides that taper out from the point of insertion as illustrated in FIG. 6. The jig is obviously designed to reliably protect the tank from external damage while it is being maneuvered. The rectangularity of the jigs makes them easier to stack. They may also be stacked on spacers 91 or in racks 193 that can accommodate a large number. Some holding tanks 40 can contain one material and other holding tanks 140 another type of material.

The full holding tanks 40 can be transported by the aforesaid forklift 96 from filling point 157 to stores 193 or 103. They can also be transported to remote sites by train or truck, form the chemical plant where the starting materials are produced to the factory where the castings, electronic components for example, are manufactured for example.

The transportation facilities 193 are illustrated in FIG. 2. The holding tanks specified herein can vary in capacity. The smallest might have a rated capacity of 400 l. Such a tank could be approximately 90 cm in diameter for example and the side of the jig could be 120 cm long. The overall assembly up to the level of clutch disk 50 will then be 180 cm high for example. These dimensions will increase only slightly, to 120, 150, and 200 cm for example, when the capacity is doubled. Assemblies with triple or quadruple the minimal capacity will each be only approximately 20 cm higher.

It will accordingly be obvious that very large volumes of material can be accommodated in comparatively little space.

To ensure that plunger 114 remains up while holding tank 40 is being transported and that the outlet at the bottom of the tank accordingly remains closed, a bolt can be screwed into an axial bore in the upper end of the plunger with the head of the bolt resting against the end of hollow shaft 52.

In contrast to the previously known methods that employ throwaway containers, material can be added to the holding tanks in accordance with the present invention in a vacuum so that the user will not need to vacuumize it later. Loading the material in a vacuum will also keep air and humidity out. Again the customer can completely or finally condition the material once the tank is in the stand. All these measures will save the customer time.

Kneading blades 116 will prevent settling during both conditioning and charging. Any fillers that have settled to the bottom during storage or transportation will be stirred up. Kneading can continue while the material is being conditioned and blended, with the baffles ensuring rapid bubble removal and reintroduction of the material. The result is an enclosed system that can handle any blend, even those that are very sensitive or that emit deleterious gases.

Several groups of blenders can be serviced directly from a single point with large-capacity tanks as illustrated in FIG. 1 for example. Once the tanks are empty they are undocked and returned to the plant to be redocked and refilled.

The rate of flow out of the tanks is regulated by the aforesaid level sensors. The rate can be adjusted to ensure consumption of approximately 100% of rated capacity (e.g. 100 l). The tank's actual capacity will be greater (e.g. 130 l) to provide room for any foam that occurs, which can account for an expansion to 125% for example. Once the contents have settled, another 25% can be added. It is only during conditioning that the total contents will decrease to less than 100%. The remaining 25% will allow time to position a new tank.

The advantage of the holding tank that constitutes a reusable container equipped with kneading blades, degassing mechanisms, heating devices, and discrete-portioning mechanisms is that such previously always necessary accessories as the blender-upstream holding tanks 11 & 12 and 111 & 112 illustrated in FIG. 2 will no longer be necessary, and material can be added directly to stationary blenders 23 and 123 from holding tanks 40 and 140 and then proceed directly to the mold-charging machines.

The apparatus illustrated in the figures can on the one hand accommodate the reusable holding-tanks for conditioning alone. It can, however, also serve as a point for distributing the conditioned material to the casting and molding machines. It is for this purpose that the apparatus includes the aforesaid stand with a beam traveling up and down on a post and provided with its various connections.

Racks can be provided on the machinery to accommodate the assemblies needed to condition the material. Such assemblies include vacuum pumps, heaters, and pneumatic and electric systems with their cabinets and controls.

The method allows full tanks to be inserted into the stands by means of forklifts. The units can be precisely positioned by means of curves.

The drive mechanisms outside are coupled to the mechanisms inside by lowering the beam and engaging the clutch.

The vacuum pump and heater and their associated controls are attached with rapid-action connectors, subsequent to which the conditioning is initiated automatically.

The method includes automatic vacuumization to a prescribed level, discontinuously if desired in order to inhibit foaming, automatic heating and reheating, automatic kneading for a prescribed period, automatic recirculation by way of lines supplying and resupplying the material at the charging point to present deposits and crusts in the lines and to ensure high-efficiency degassing, and automatic release of material to the mold-charging machine upon expiration of a prescribed conditioning time.

The beam is preferably raised and lowered with a spindle motor. The kneading blades are rotated by a continuous transmission at 20 to 60 rpm for example. The heating devices are preferably heat exchangers or resistance heaters accompanied by the requisite safety features and controls and operating at temperatures between room temperature and 130° C. for example. The preferred tank dimensions dictate powers of 10 to 20 kW.

The vacuum pump is a single-stage rotary-disk pump with the appropriate safety features and controls, pumping 50 to 100 $m^3$ an hour.

Each reusable container essentially consists of the cylindrical all-steel container in its jig. It is accordingly appropriate for the transportation of even abrasive casting materials that fillers have been added to when the fillers tend to settle to the bottom. The materials' producers can, due to the tanks's air-tightness, load them in a vacuum before shipment. The end user will then insert them into position at the conditioning-and-charging site as hereintofore described. When such tanks are employed, no separate heating and kneading equipment, receptacles, or means of trash disposal will be necessary.

Industrial-safety measures can also be considerably reduced.

Each tank includes integrated kneading blades that fit into the base along with pulverizers. Any sediment will accordingly be stirred up and the contents homogenized once the tank has been docked.

Also present are rapid-action connections for the kneading blades and pumps, an interior circulation system that helps eliminates leakage along with any sealing problems that may accompany operations in the vacuum, interior shallow-flow structures for rapid degassing, and an optional exterior high-performance hot-degassing system with flow controls operated independent of the kneading blades. Heating can as desired be carried out with such a fluid as oil or water flowing through the hollow wall of the tank or electrically with a tailored blanket. Isolation with an all-steel jacket is practical.

Settling can also be impeded by a flow-rate controlling screw in the outlet from the holding tank.

The screw-on lid facilitates cleaning out the tank. The tank's outlet is preferably provided with a cap to protect it during transportation. The jig that surrounds the tank also helps to protect it during transportation and facilitates stacking. It is designed to function in conjunction with a forklift.

Different intakes can conveniently be employed to match the dimensions of the manufacturer's connectors. Connections are established with rapid-action connectors, and the vacuum connection can have vacuum controls and a cock. The heating connections can be established by electric plugs or, when fluid is employed, by way of rapid-action drip-free connectors. Similar rapid-action connectors are also available for the kneading-blade and pump drive mechanisms. Since the connector for mass conveyance is at the bottom of the tank, the tank can be optimally emptied. A connection for mass recirculation with the recirculation pump can be provided on the lid, above the shallow-flow degassing baffle.

FIELD OF APPLICATION

The method and apparatus can be utilized on an industrial scale in the electrical industry.

I claim:

1. Apparatus for storing casting materials or components thereof, transporting them from a first site to a second site, conditioning them and charging them to casting machines, comprising:

a) at least one tank for holding said casting materials or components thereof, positioned along with casting machines, blenders or casting-machine chargers, said at least one tank having an open top with lids or intakes with caps and wherein air can be evacuated from said at least one tank and wherein associated with each of said at least one tank is an extruder that releases discrete portions of said materials or components to downstream processing devices, b) a jig and stand that accommodates said at least one holding tank and which have mechanisms that couples the drive mechanisms to kneading blades inside the at least one tank and wherein said stand also accommodates a take-apart clutch and rapid-action connectors for attaching the drive mechanism or a source of vacuum outside the at least one holding tank to equipment inside the at least one tank for vacuumizing the tank.

2. Apparatus as in claim 1, characterized in that the stand accommodates rapid-action connectors for establishing communication between a reservoir of fluid outside the at least one holding tank and heating structures (149 or 153) inside the at least one tank for heating for the material therein.

3. Apparatus as in claim 1, characterized in that the stand accommodates rapid-action connectors for establishing communications between regulators and controls for mechanical, electric, vacuum, and heating and cooling mechanisms and sensors in the at least one holding tank that detect temperature, pressure, viscosity, mechanical-component location, or a combination thereof.

4. Apparatus as in claim 1, characterized in that the stand has a mechanism (44) for lifting the lid (62) off the at least one holding tank (40).

5. Apparatus as in claim 4, characterized in that the lid is provided with mechanisms that drive the kneading blades and material-forwarding pump (78 & 86).

6. Apparatus according to claim 1, 5 characterized in that a wall (147 & 145) of the at least one holding tank is hollow and accommodates a hot fluid, whereby the contents can also be kept warm by an electric blanket (149) wrapped around the tank.

7. Method of storing casting materials or component thereof, transporting them from a first site to a second site, conditioning them and charging them to casting machines, comprising:

a) loading said casting materials or components thereof into one or more first holding tanks, said one or more first holding tanks having open tops with lids or intakes with caps, outlets and each of which has associated therewith an extruder that accommodates a plunger and is capable of releasing discrete portions of said casting material or component thereof, said plunger being actuated by drive mechanisms which also opens or closes the tanks' outlets and wherein one or more second holding tanks can be connected to said one or more first holding tanks downstream at said second site to assume handling of said casting material or components thereof, with said associated extruders that release discrete portions of casting material, said casting materials or components being loaded into said one or more first holding tanks with the outlets closed and the tops or intakes open, b) the tops or intakes are then closed, c) air is optionally evacuated from the loaded tanks, d) said loaded tanks are then transported to said second site, or stored for later transportation to said second site, and e) at said second site, said tanks are connected to casting machines, said materials are conditioned, and the casting machines charged with them.

8. Method as in claim 7, characterized in that the material is recirculated from one holding tank to another through supply or refluxing lines.

9. Method as in claim 8, characterized in that vacuum, temperature, and proportions can be regulated by controls.

10. Method as in claim 9, characterized in that the kneading blades are kept in intermittent motion.

* * * * *

UNITED STATES PATENT AND TRADEMARK OFFICE
CERTIFICATE OF CORRECTION

PATENT NO. : 5,529,212
DATED : June 25, 1996
INVENTOR(S) : Terhardt, Josef

It is certified that error appears in the above-indentified patent and that said Letters Patent is hereby corrected as shown below:

Col. 12, line 2      Delete " for " (second occurrence)

Col. 12, claim 6     Delete " 1, " and after " 5 " insert
line 1               -- , --

Signed and Sealed this

Third Day of December, 1996

Attest:

BRUCE LEHMAN

*Attesting Officer*     *Commissioner of Patents and Trademarks*